United States Patent [19]

Aldred et al.

[11] Patent Number: 4,878,338
[45] Date of Patent: Nov. 7, 1989

[54] GRASS CUTTING MACHINE

[75] Inventors: Edward J. Aldred, Ipswich; David J. Lloyd, Suffolk, both of United Kingdom

[73] Assignee: Ransomes, Sims & Jefferies PLC, United Kingdom

[21] Appl. No.: 143,850

[22] PCT Filed: May 18, 1987

[86] PCT No.: PCT/GB87/00341
§ 371 Date: Jan. 19, 1988
§ 102(e) Date: Jan. 19, 1988

[87] PCT Pub. No.: WO87/06792
PCT Pub. Date: Nov. 19, 1987

[30] Foreign Application Priority Data

May 16, 1986 [GB] United Kingdom ................. 8611932

[51] Int. Cl.4 ...................... A01D 34/44; A01D 34/58
[52] U.S. Cl. ..................................... 56/7; 56/DIG. 15
[58] Field of Search ................. 56/6, 7, DIG. 15, 10.2

[56] References Cited

U.S. PATENT DOCUMENTS

| 3,177,638 | 4/1965 | Johnson | 86/7 |
| 3,511,035 | 10/1967 | Strasel | 56/7 |
| 3,563,011 | 2/1971 | Bramley |  |
| 3,918,290 | 11/1975 | Haffner et al. | 56/7 |
| 4,130,980 | 12/1978 | Fardal et al. | 56/DIG. 15 |
| 4,142,348 | 3/1979 | Jordan et al. | 56/10.2 |
| 4,296,409 | 10/1981 | Whitaker et al. | 56/10.2 |
| 4,458,471 | 7/1984 | Herwig | 56/DIG. 15 |
| 4,487,002 | 12/1984 | Kruse et al. | 56/DIG. 15 |
| 4,548,027 | 10/1988 | Maeoka | 56/DIG. 15 |

FOREIGN PATENT DOCUMENTS 1953154 4/1970 Fed. Rep. of Germany .
2328088 12/1974 Fed. Rep. of Germany .

Primary Examiner—Paul J. Hirsch
Attorney, Agent, or Firm—Browdy and Neimark

[57] ABSTRACT

A grass cutting machine has two forward cutting units (24) and one rear central unit (46). The mechanism at, for example, the margin of a golf green, provides a time delay between lifting or lowering of the front (24) and rear cutting units (46) which is determined by the distance travelled by the machine. In this way it is ensured that all unites start and stop cutting at the same reference point on the ground.

3 Claims, 8 Drawing Sheets

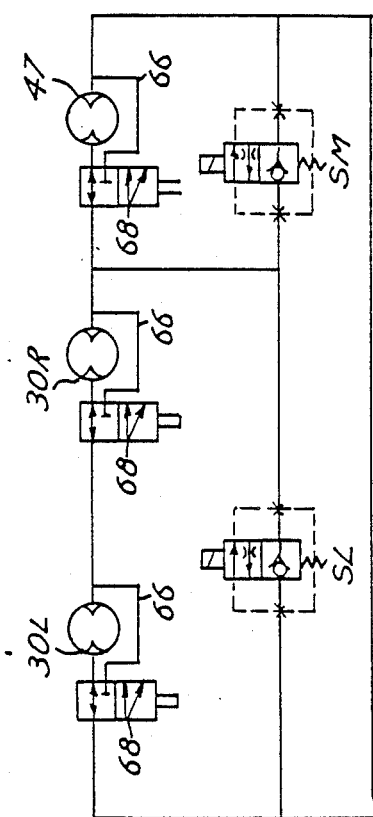
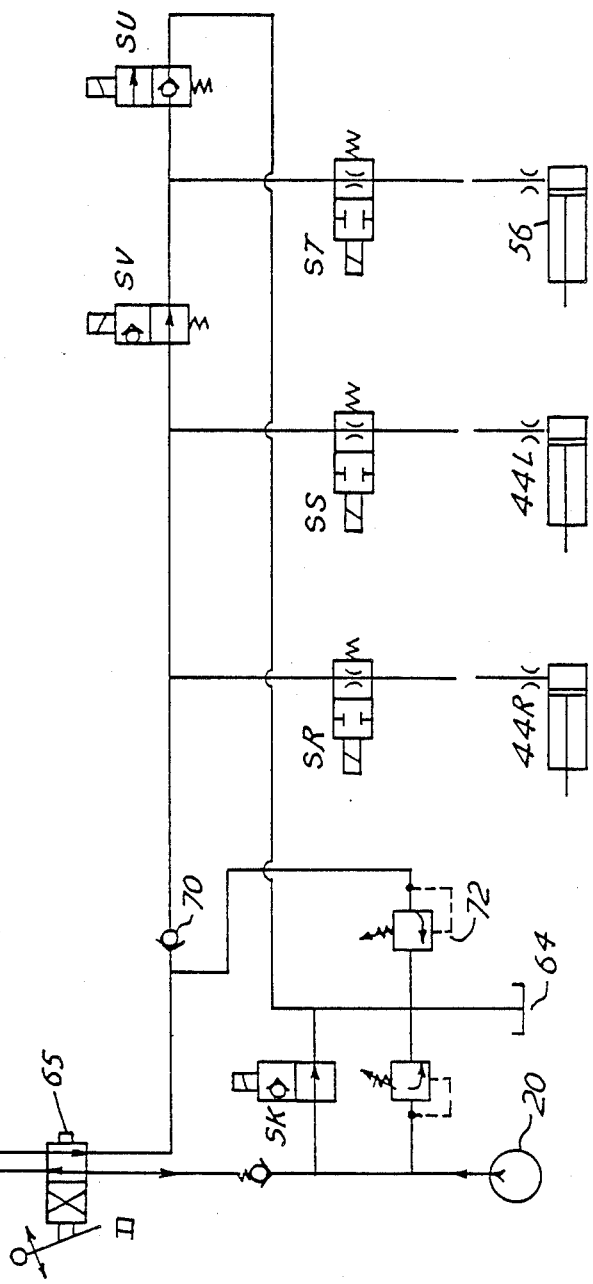
FIG. 3

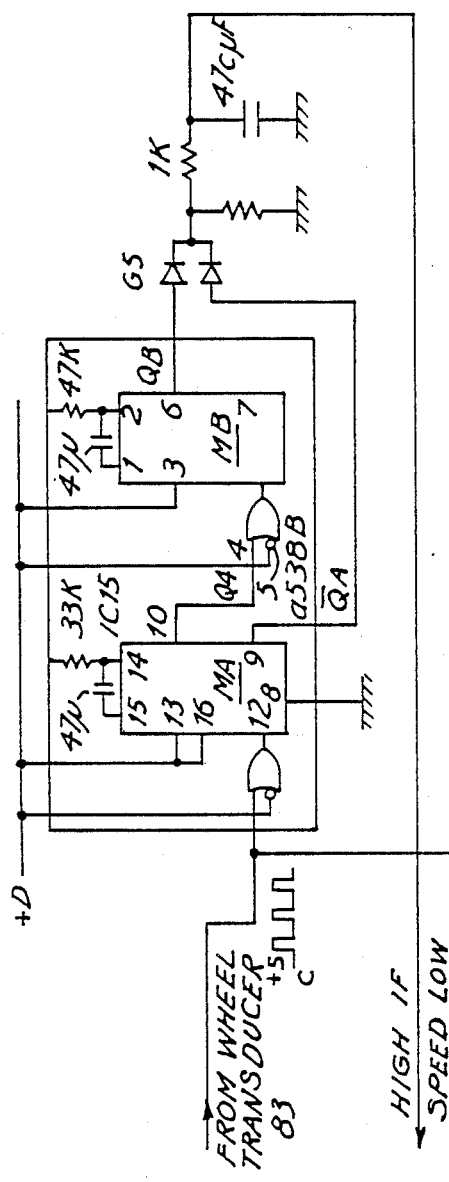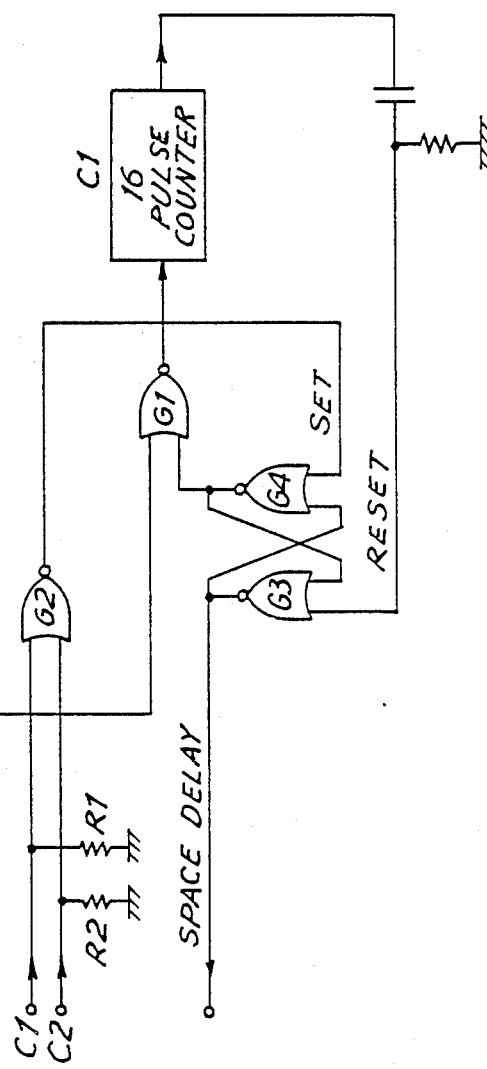
FIG.5

| SOLENOID VALVE | | | K | L | M | U | V | T | S | R |
|---|---|---|---|---|---|---|---|---|---|---|
| HIGH SPEED:PEDAL CTRL. | PEDAL SEQUENCE I | DOWN | O | | | O | | O | | |
| | | -AFTER DLY. | O | | | O | | | | |
| | | RELEASE PED. | O | O | | O | | | | |
| | | -AFTER DLY. | | | | O | | | | |
| | | UP | O | O | O | | | | | |
| | | RELEASE PED. | | | | | | | | |
| | PEDAL SEQUENCE II | DOWN | O | | | O | | O | | |
| | | -AFTER DLY. | O | | | O | | | | |
| | | UP DIRECT | O | O | | O | O | | | |
| | | -AFTER DLY. | O | O | O | | | | | |
| | | RELEASE PED. | | | | | | | | |
| SLOW OR STOPPED SERVICE MODE | HAND CONTROL | SLOW.STOP | O | O | O | | | | | |
| | | -AFTER 5-10sec | | | | | | | | |
| | | LIFT | O | O | O | | | | | |
| | | -AFTER 5-10sec | | | | | | | | |
| | | LOWER | | | | O | HU1 | O | | |
| | | RUN FWD. | O | | | O | HU2 | | O | |
| | | RUN REV. | O | O | O | O | HU3 | | | O |
| | | OFF | | | | | REL | | | |

GRASS CUTTING MACHINE

This invention relates to grass cutting machines with particular emphasis on machines for cutting golf greens.

When cutting golf greens, it is desirable for the cutting unit to be raised and lowered with precision at the margins of the green. With a single cutting unit, this can be simply achieved by the manual operation of a lifting handle. Where the machine carries more than one unit (and there are usually three cutting units) it is necessary for a mechanical lifting mechanism to be provided. As will be well understood, three cutting units cannot be positioned in a single transverse line since the total width of each unit exceeds the cutting width. A transverse in-line arrangement would therefore leave strips of grass uncut. To overcome this problem, three cutting units are typically arranged as a pair of wing cutters and a single central cutter positioned either in front of or behind the wing cutters.

If the spacing of the wing and central cutting units in the direction of motion is kept to a minimum, all three cutting units can be lowered or lifted simultaneously without significant degradation of the boundary between cut and uncut grass at the green edge. There are, however, problems in having all three cutting units so close together and for this reason prior art designs have often incorporated a significant spacing between the units in the direction of motion. Simultaneous lowering or lifting of all units would then tend to degrade the cut green boundary since the points on the ground at which the front and rear cutting units started or stopped cutting would be a significant distance apart. It has been proposed to introduce a time delay between the lowering of the front and rear units and between the lifting of the front and rear cutting units. This has not however, satisfactorily resolved the problem.

It is an object of this invention to provide an improved grass cutting machine in which cutting operations of cutting units spaced in the direction of motion of a moving machine are started at substantially the same reference point on the ground and, similarly, halted at substantially the same reference point. It will be understood that cutting operations of a unit can be started by lowering the unit to the ground or by engaging drive to an already lowered unit. Similarly, cutting operations can be halted by lifting a unit or by disengaging drive to the unit.

The present invention consists, in one aspect, in a grass cutting machine having spaced forward and rearward cutting units; respective unit control means for starting and stopping cutting operations of the units and common control means adapted to actuate said unit control means in response to a common cutting start signal or a common cutting stop signal, wherein there are provided distance transducer means adapted to supply the common control means with a distance signal indicative of the distance travelled by the machine, the common control means being adapted to space actuation of the respective unit control means by a time interval computed in response to said distance signal and the known separation of the cutting units in the direction of motion such that, when the machine is moving, the cutting units start cutting operations at substantially the same point on the ground and stop cutting operations at substantially the same point on the ground. Preferably, there are further provided speed threshold means adapted to supply the common control means with a speed signal indicative of whether the ground speed of the machine is above or below a pre-set threshold; the common control means being switched between a service mode corresponding to zero or very low ground speeds and a cutting mode corresponding to significant ground speeds in dependence on said speed signal and adapted in said service mode, to actuate said unit control means simultaneously in response to a common cutting start signal or a common cutting stop signal and, in said cutting mode, to space actuation of the respective unit control means by said time interval.

It will be understood that since the time delay between stopping or starting cutting operations of the forward and rearward cutting units is computed from the distance travelled by the machine, the boundary between cut and uncut grass remains well defined even if the ground speed of the machine varies. The preferred form of the invention in which the common control means is switched between a service mode and a cutting mode in dependence upon the value of the speed signal, enables a very simple distance transducer to be used with correspondingly simple control circuitry. The skilled man will appreciate that a simple distance transducer will have difficulty in distinguishing between zero and very low forward speed. By ensuring that the delay is only introduced at ground speeds above a predetermined minimum, such problems are avoided.

It is an object of a further aspect of this invention to provide an improved grass cutting machine in which the operator is provided with accurate information relating to the quality of cut. Conventionally, the quality of cut of a grass cutting machine is defined in terms of either "cuts per meter" which is the number of reel blade passes for one meter of forward movement of the machine, or "inch-clip" which is the distance in inches along the ground between successive blade passes. If the ground speed and cutting reel speed vary independently, there is a danger that the operator will depart inadvertently from a desired quality of cut standard. In the past, a graph has been supplied with each machine from which the operator can determine the quality of cut from his knowledge of both reel speed and ground speed. Whilst this provides the necessary information, it is a cumbersome and time consuming procedure for the operator. Another proposal has been to mark the scale of movement of the ground speed control lever with "coarse" and "fine" bands indicating whether the quality of cut (at an assumed reel speed) is above or blow a predetermined threshold. Whilst this approach has the merit of simplicity, it is believed that more accurate quality of cut information would be beneficial.

Accordingly, the present invention consists, in a further aspect, in a grass cutting machine having at least one cutting reel unit; ground speed sensor means for providing an electrical signal indicative of the ground speed of the machine; reel speed sensor means for providing an electrical signal indicative of the driven reel speed of the cutting unit; processor means for computing from said signals a value for the quality of the cut; and display means for displaying said quality of cut value.

This invention will now be described by way of example with reference to the accompanying drawings in which:

FIG. 3 is hydraulic circuit diagram of the machine shown in FIG. 1;

FIGS. 5A and 5B are diagrams illustrating details of the circuit of FIG. 4;

Figure 1:
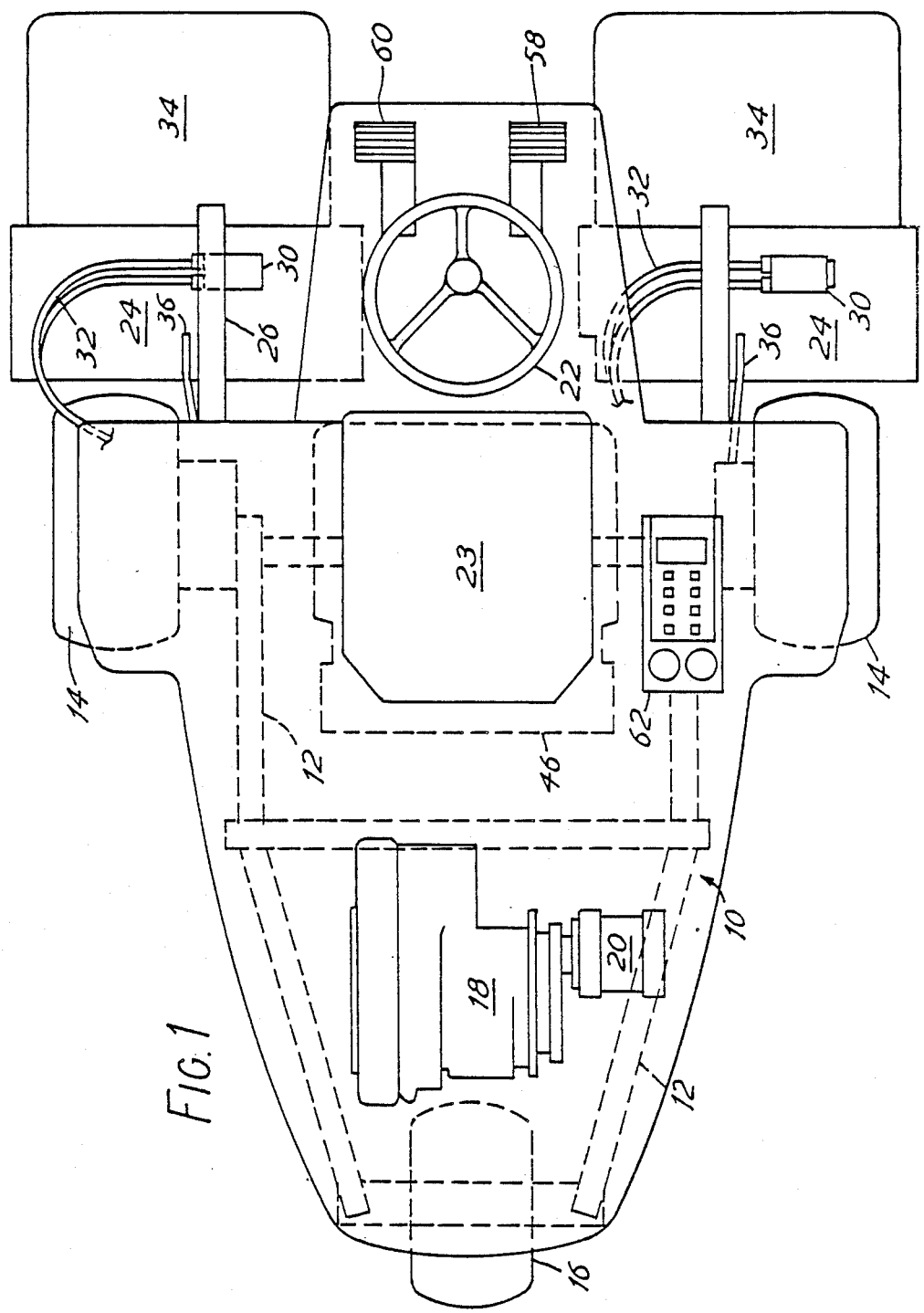
FIG. 1 is a plan view, in partly schematic form, of a grass cutting machine according to this invention.

The grass cutting machine shown in the drawings at 10 comprises an A-frame chassis 12 supported on two front wheels 14 and a rear wheel 16. The chassis carries, towards the rear, a conventional diesel engine 18 which provides the traction drive for the machine through the front wheels 14, via a hydrostatic transmission (not shown). The engine 18 also power a hydraulic pump 20 which, as will be described, provides a drive for the cutting units as well as the powered lifting mechanism for those cutting units. The rear wheel 16 is steerable through a steering wheel 22 which is position adjacent the operator's seat 23. Suitable bodywork 21 is mounted on the chassis.

So far as described above, the grass cutting machine is of generally conventional form and more detailed description of the mentioned components is not believed to be necessary for an understanding of the present invention.

Figure 2:
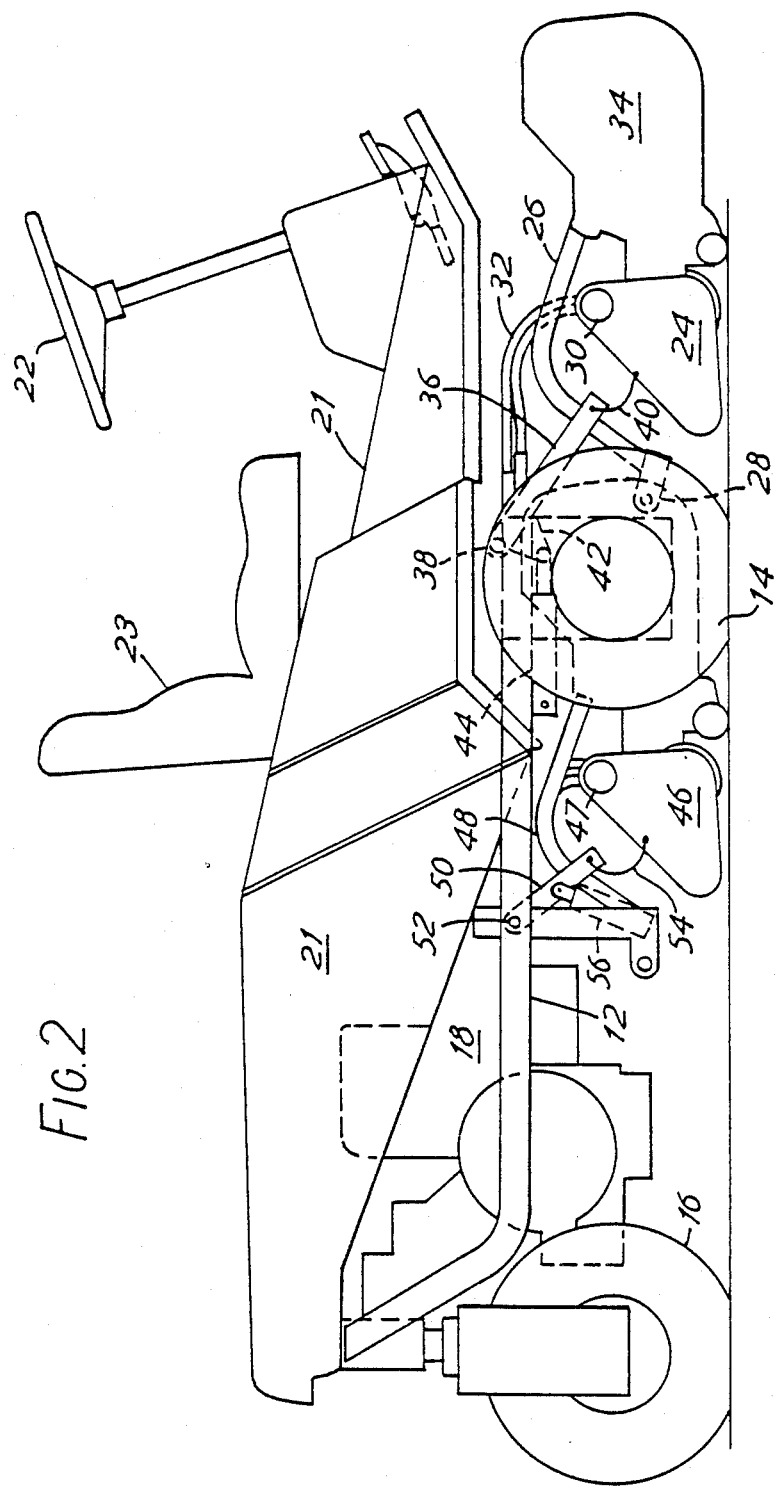
FIG. 2 is a side view of the machine showing the mounting of the grass cutting units.

Two forward cutting units 24 of the reel type are supported from the chassis on respective support arms 26 each pivotally mounted with respect to the chassis on an axle 28. Each cutting unit is provided with a hydraulic drive motor 30 receiving hydraulic fluid through lines 32. Each cutting unit further includes a grass box 34. To enable lifting of each cutting unit from the cutting position shown in the drawings, a lift arm 36 pivotally mounted on the chassis at 38 is connected at its free end to the cutting unit by a cable 40. A crank plate 42 is formed integrally with the lift arm adjacent the axis 38 and a hydraulic lifting ram 44 extends between the crank plate and a rearward location in the chassis. It will be recognised that upon extension of the hydraulic ram 44, the lift arm 36 is caused to pivot anti-clockwise (as seen in FIG. 2) so lifting the cutting unit with pivotal movement of the support arm 26 about axle 28.

A rearward central cutting unit 46 driven through hydraulic motor 47 is positioned beneath and slightly to the rear of the operator's seat 23. In a analogous with the front cutting units, the unit 46 is supported from a pivotally mounted support arm 48. A lift arm 50 pivotally mounted on the chassis at 52 is connected at its free end to the cutting unit 46 by a cable 54. A hydraulic lifting ram 56 extends between the chassis and the midlength of the lift arm 50 to enable lifting of the cutting unit by anticlockwise rotation (as seen in FIG. 2) of the lift arm about axis 52.

The operator controls on the machine include a foot pedal 58 controlling forward and rearward movement of the machine and a foot pedal 60 controlling the lifting and the lowering of the units, this latter foot pedal being linked with a hand lever (not shown) which effectively locks the units in the lifted position. In addition, the controls include a push button console 62.

The hydraulic circuit of the machine is shown in FIG. 3. The hydraulic pump 20 is adapted to be continuously driven and is connected with the tank 64 by a solenoid operated valve SK. This valve is normally open so that hydraulic fluid is recycled to the tank. Valve SK is connected through a reel reversing valve 65 with the serially interconnected cutting unit hydraulic motors 47, 30L (left) 30R (right). Each cutting motor is provided with a by-pass loop 66 controlled by a bypass valve 68. These by-pass valves are mechanically linked in a manner not shown in the drawings with the lifting arms associated with the respective cutting units such that when the cutting unit is in the lifted position, the by-pass valve 68 effectively disables the motor. In parallel with cutting motor 47 (driving rearward cutting unit 46) there is mounted a solenoid operated valve SM. Similarly, a solenoid operated vlave SL is connected in parallel with cutting motors M2 and M3. In this way, independent control may be exercised over the rearward cutting unit 46 or, the forward cutting units 24.

Fluid which has either passed through or by-passed the cutting motors returns via the reel reversing valve 65. Connection is made from this valve to a parallel arrangement of three solenoid operated valves, ST, SS, and SR associated respectively with the lifting rams 56, 44L and 44R. In the case of lifting rams 44 L and R the connection is made directly from the reversing valve 65; in the case of lifting ram 56 the connection is through a solenoid operated valve SV. This valve is additionally connected with a further solenoid operated valve SU offering a return path to the tank.

A check valve 70 is interposed between the reel reversing valve 65 and the solenoid valves SR, SS and SV. Upstream of this check valve 70 there is provided an alternative return path to the tank through pressure relief valve 72.

It is considered preferable to describe the manner of operation of the hydraulic circuit before dealing in detail with the electronic circuitry which serves to operate the solenoid valves.

If it is assumed that the machine is approaching a golf green at reasonable speed with all three lift rams in the up position, the operator will actuate the foot pedal 60 to lower the front cutting units at the correct point. Valve SK is opened so providing pressurised fluid to the circuit and at the same time valves SU and ST are actuated. Since lifting rams 44 now have a return path to tank through valves SV and SU, the associated forward cutting units 24 fall under gravity. The actuation of valve ST to the closed state maintains lifting ram 56 in the up position. With valves SL and SM normally closed, the cutting motors will be under control of the associated by-pass valves, that is to say cutting motors 30 will be energised as the forward lift arms fall whilst cutting motor 47 will remain disabled.

After a delay which is derived in a manner to be described, solenoid valve ST is released to return to the normally open position thus allowing fluid to flow from the ram 56 through the valve SU to the tank, the rearward cutting unit 46 therefore falls and begins to rotate as the by-pass vaklve is opened.

If the control pedal is released because, for example, the machine is leaving the green, valve SL is actuated to by-pass cutting motors 30 and thus halt cutting operations of forward cutting units 24. After the mentioned delay, valve SK is operated so effectively disabling all three cutting motors. If the operator then moves the foot pedal to the lift position solenoid valve SK is closed with the result that, with valve SU remaining closed, all three lifting rams are supplied with hydraulic fluid to lift pressure determined by relief valve 72. Since valve SK is being closed, it is necessary to open both valves SL and SM to ensure that all cutting motors remain stationary.

Figure 4:
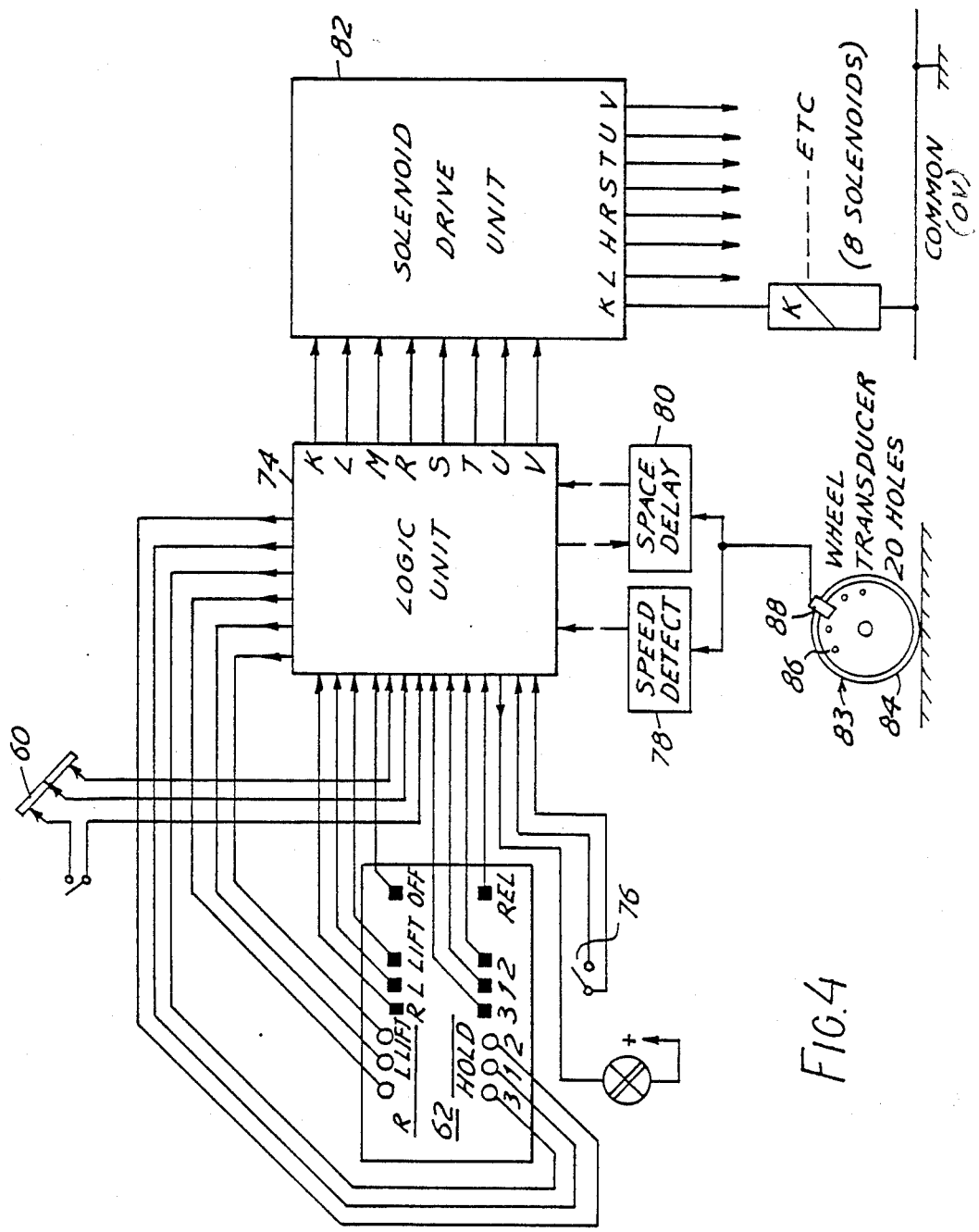
FIG. 4 is an electrical circuit diagram of the machine shown in FIG. 1.

Referring now to FIG. 4, there is shown in outline the electrical circuitry which provides the necessary signals to actuate the solenoid valves K, L, M, R, S, T, U and V. It will be seen that a logic unit 74 receives inputs from the console 62, the foot pedal 60 and a micro switch 76 indicating whether the reels are being driven forward in a normal cutting operation or backward for backlapping. The logic unit also receives signals from a speed detecting unit 78 and a space delay unit 80 which will be described more fully hereafter. The principal outputs of the logic unit comprises a series of logic outputs one each for the solenoid valves. These are converted in a solenoid drive unit 82 to signals of a sufficient power to actuate the solenoid valves.

The speed detecting units 78 and space delay unit 80 receive in parallel an output from a wheel transducer 83. As shown diagrammatically, one of the wheels of the machine is provided with a coaxial disc 84 having a number of equally spaced holes 86 around the perimeter. An optical switch 88 comprising a collimated infrared light source on one side of the disc and a phototransistor on the other serves to provide a stream of pulses whose repetition rate is proportional to the disc speed and thus to the ground speed of the machine.

Figure 6:
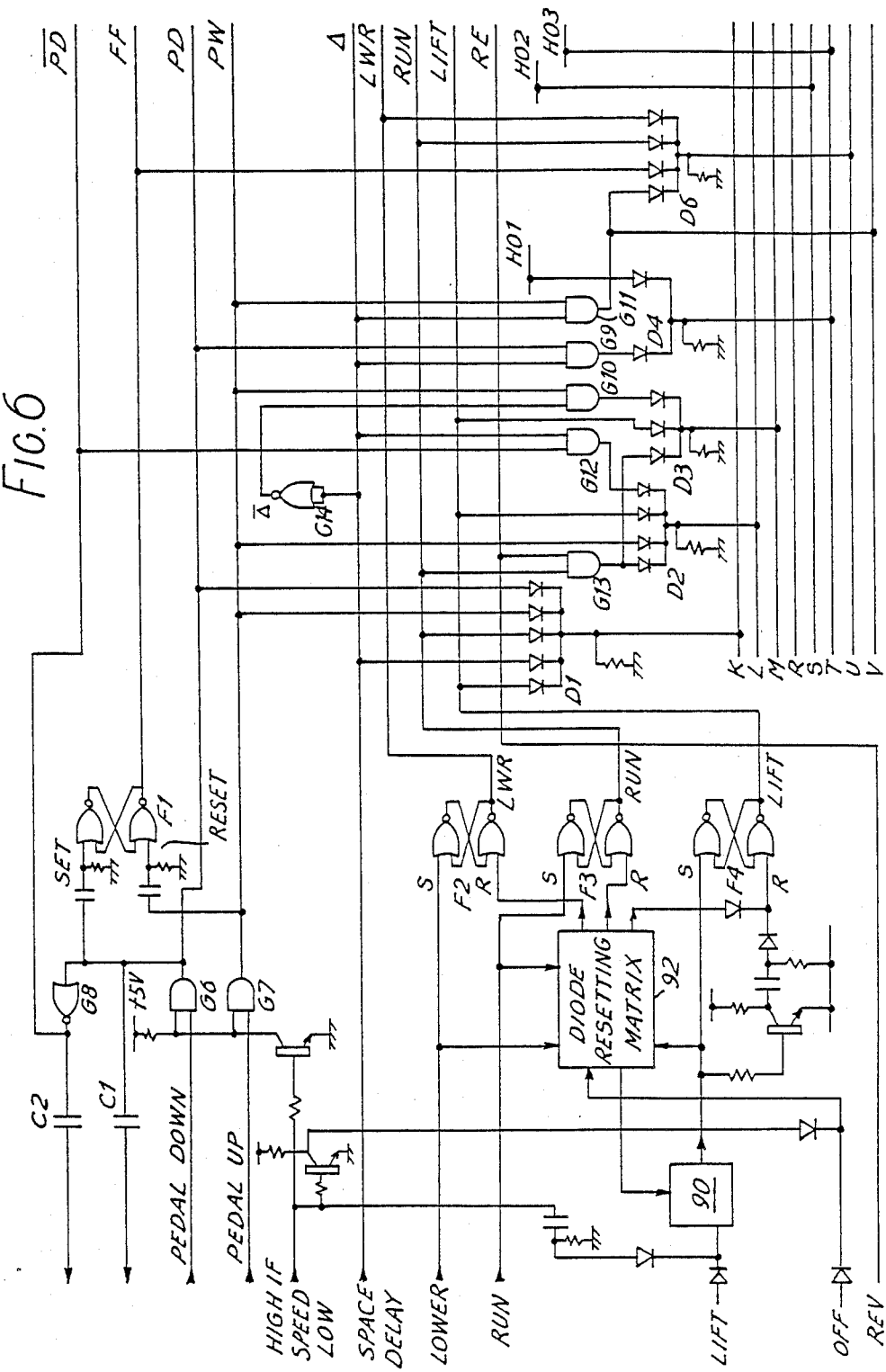
FIG. 6 is a circuit diagram illustrating in further detail of the circuit of FIG. 4.

Referring now to FIG. 5B, the space delay unit 80 will be described in more detail. The output of the wheel transducer 83 is supplied to NOR gate G1. If the foot pedal 60 is moved from neutral to down or released from down to neutral a signal will appear as will be described on either of the inputs to NOR gate G2 thus setting the flip-flop constituted by NOR gates G3 and G4. This has the two effects of setting the SPACE DELAY line high and also allowing pulses from the wheel transducer through to the counter C1. Counter C1 produced an output pulse after counting 16 input pulses which resets the flip-flop and returns the SPACE DELAY line to the low level. Turning now to FIG. 5A, the wheel transducer output is presented to a monostable MA providing inverted and non-inverted outputs QA and QA respectively. QA is connected with a further monostable MB, the output of which is OR'd by diode gate G5 with QA. If the period of wheel pulses is less than the output pulse length of monostable MA, that is to say if the wheel speed is above a predetermined minimum, QA will be continuously retriggered and will remain high. Signal QA will remain continuously low and since the input to monostable MB is not pulsed the output QB will remain similarly low. It follows that the line HIGH IF SPEED LOW will remain low. If the wheel speed drops below the predetermined minimum, the period of the wheel-pulses will exceed the pulse length of monostable MA so that outputs QA and QA become pulsed. An output QB is now produced from monostable MB and it will be seen from the timing diagram which is FIG. 8 that the effect of OR'ing QB and QA is to produce a continuously high signal on line HIGH IF SPEED LOW The logic unit 74 is shown in FIG. 6. It will be seen that the PEDAL DOWN and PEDAL UP signals from foot pedal 60 are each AND'ed with the HIGH IF SPEED LOW line in gates G6 and G7 respectively.

The effect is that foot pedal control is disabled in a service mode at low speed. In addition, the output from AND gate G6 is connected directly to a capacitor C1 and—via NOR gate G8—to a capacitor C2. The respective opposite terminals of capacitors C1 and C2 form the previously mentioned inputs to NOR gate G2 shown in FIG. 5A, the capacitors C1 and C2, together with the grounded resistors R1 and R2 forming a differentiating network which provides pulses at the positive and negative going edges of the PEDAL DOWN signal.

The outputs from AND gates G6 and G7 form the set and reset inputs of a flip-flop F1. The output lines PEDAL DOWN (PD) from gate G6, PEDAL UP (PU) from gate G7, FF from flip-flop F1 and PD from NOR gate G8 are connected as will be described with the logic circuitry driving the ouput lines of the logic unit. These output lines correspond respectively with the solenoid valves K, L, M, R, S, T, U and V.

Line PD is connected as one input to a diode OR gate D1 the output of which is connected with output line K. The line PD is further connected as an input to AND gate G9 connected in turn to diode OR gate D4 driving output line T. Line PU forms a further input to diode OR gate D1 and is connected also as an input to diode OR gate D2 driving ouput line L. Further connections are made between line PU and AND gate G10 forming an input to diode OR gate D3 driving output line M, and to AND gate G11 connected to diode OR gate D6 driving output line U. Line FF forms a further input to diode OR gate D6 and line PD is connected to AND gate G12 the output of which is taken to diode OR gate D2.

One set of outputs from the operator console 62 are designated as lines LOWER, RUN, LIFT and OFF. The LOWER, RUN and LIFT lines are associated respectively with flip-flops respectively F2, F3 and F4. The LOWER and RUN lines are connected respectively with the set inputs of flip-flops F2 and F3; the LIFT line is connected with the set input of flip-flop F4 through a delay unit 90. Each of the flip-flops F2, F3 and F4 has a reset line connected with a diode resetting matrix 92. This matrix receives as inputs, the OFF line and the HIGH IF SPEED LOW LINE and serves to disable all three flip-flops if the HIGH IF SPEED LOW line is low (indicating that the machine is in the cutting mode) or if the OFF button is energised. In addition, the diode resetting matrix receives as an input the set input of each flip-flop so that setting any one of the three flip-flops F2, F3 and F4 automatically resets the other two. Selection of the LOWER, RUN and LIFT console buttons is therefore mutually exclusive. A further set of operator console comprise HOLD lines HO1, HO2 and HO3, corresponding respectively with the cutting units and a reverse output REV which is energised when the wheels are to be driven in reverse for backlapping. These console outputs are connected with the above described logic circuitry as follows. The output of flip-flop F2 (LWR) forms an input to diode OR gate D6. The output of flip-flop F3 (RUN) forms inputs to diode OR gates D1 and D6 and is also connected to AND gate G13 forming an input to diode OR gate D2. The output of flip-flop F4 (LIFT) forms inputs to diode OR gates D1, D2 and D3. HOLD line HO1 forms the second input to diode OR gate D4 whereas HOLD lines HO2 and HO3 are directly connected to output lines S and T respectively. Line REV is connected as the second input to AND gate G13. To complete the logic circuitry the SPACE DELAY line is connected to OR gate D1, AND gates G9 and G11 and G2 and to NOR gate G14 forming the second input to AND gate G10.

It will be understood that two distinct modes of operation are defined; a service mode which applies when the machine is stationary or travelling at a very low speed and a cutting mode. Switching between these two modes is effected by the HIGH IF SPEED LOW line. In the cutting mode, the foot pedal 60 is enabled. To take one example, it would be seen that depression of the foot pedal giving a signal on line PD serves through OR gate D1 to energise valve K. The set output FF similarly energises valve SU through OR gate D6. Solenoid valve ST is initially energised through the AND'-ing of signals PD and SPACE DELAY in gate G9 through OR gate D4. As the SPACE DELAY signal returns to low, solenoid valve ST is de-energised as required in the above described sequence of operation of the hydraulic circuit.

In the service mode, when the line HIGH IF SPEED LOW is high, the foot pedal is disabled. If the operator console LOWER button is energised, solenoid valve SU is energised through line LWR and OR gate D6 allowing all three cutting units to fall under gravity simultaneously. Similarly, the three cutting units ca be lifted simultaneously by the closing of valve SK through OR gate D1 and line LIFT. To avoid the dangers that would be associated with continuous energisation of the lifting rams, the delay unit 90 is provided so that flip-flop F4 is reset automatically after a selected delay typically in the range of 5 to 10 seconds.

Figures 8, 9:
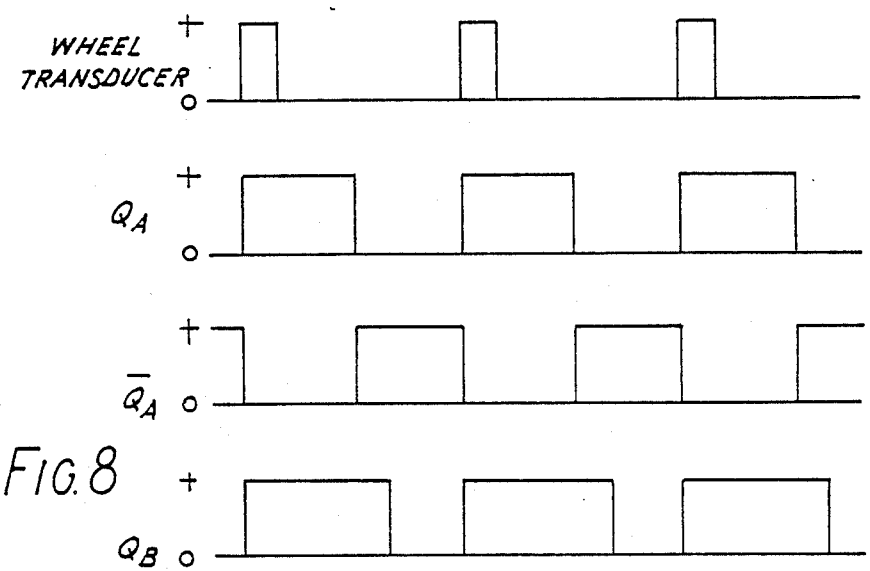
FIG. 8 is a series of waveforms illustrating the operation the circuit of FIG. 4.
FIG. 9 is a truth table illustrating the operation of the hydraulic circuit of FIG. 3.

In order to clarify further the operation of the logic unit, reference should be made to FIG. 9 which takes the form of a truth table. In the cutting mode, where the console buttons are disabled, the operator has the choice of two foot pedal sequences. Either, the foot pedal can first be moved to the neutral position to stop the cutting units with the appropriate delay and then moved to the LIFT position to lift all three units simultanously, or, in a single operation the pedal can be moved to the LIFT position to lift the front cutting units and, after an appropriate delay, the rear cutting unit. In this sequence, the cutting units are stopped automatically when they reach their lifted position as previously described.

Figure 7:
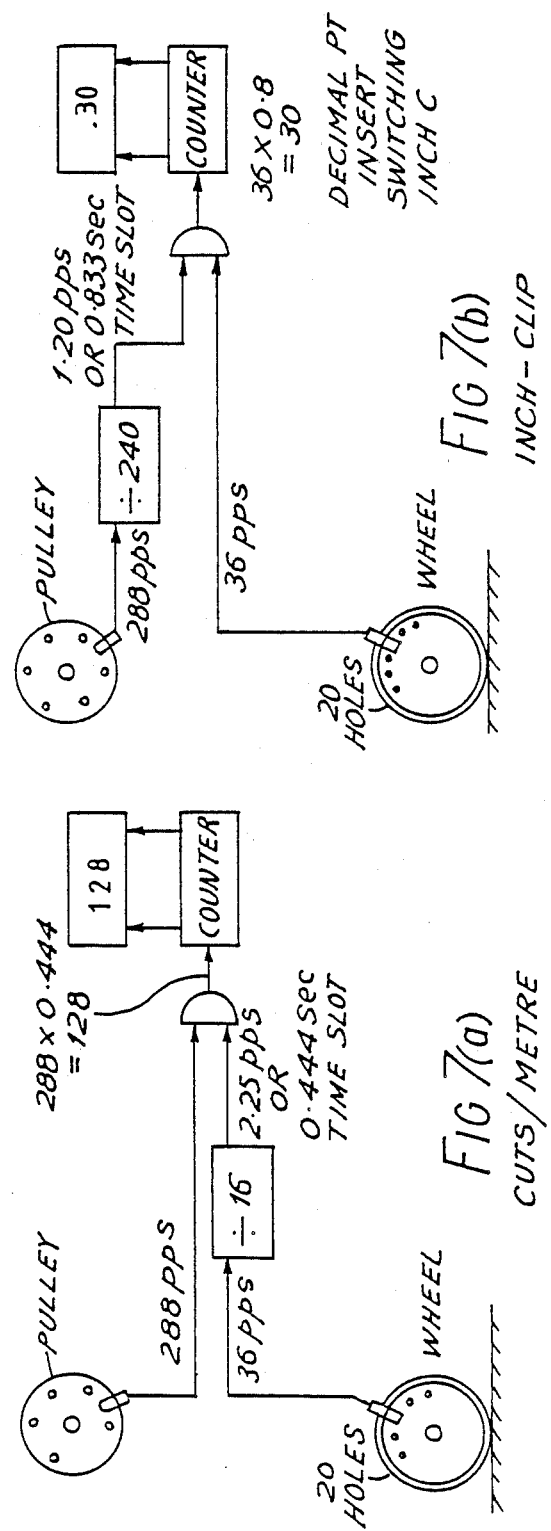
FIGS. 7A and 7B are sketches illustrating the quality of cut computation.

The output from the wheel transducer 83 is additionally used, as illustrated in FIG. 7A to produce a quality of cut display on the console. A similar apertured disc—and optical switch arrangement—to that forming the wheel transducer is provided on a drive pulley of the pump, the rotation of which pulley is chosed to be proportional to reel speed. In the case in which it is desired to produce a display of cuts per meter, the output from the wheel transducer is divided by 16 in a frequency divider. The output of the divider is AND'ed with the transducer on the pump output. The output of the AND gate is fed to a counter which drives the cuts per meter display. It will be understood that the divider effectively defines a time window corresponding to a distance travelled by the machine and the counter effectively counts the number of blade passes within that distance.

It is a simple matter to produce optionally an "inch-clip" measurement in which case, as shown in FIG. 7B, the ouput from the pump transducer defines the time window in which pulses from the wheel transducer are counted. Preferably, both circuits are provided and the option selected by a simple switch.

We claim:

1. A grass cutting machine comprising:
   (a) spaced forward and rearward cutting units;
   (b) respective unit control means connected to receive actuating signals and adapted in response to said actuating signals for starting and stopping cutting operations of the cutting units;
   (c) distance transducer means for providing a distance signal indicative of the distance of travel of the machine;
   (d) operator actuable means for providing a common cutting start signal and a common cutting stop signal; and
   (e) common control means connected to receive said distance signal, said common cutting start signal and said common cutting stop signal and adapted on receipt of said common cutting start signal or said common cutting stop signal to provide actuating signals to said respective unit controls means, said actuating signals being spaced by a time interval computed by the common control means in response to said distance signal and the known separation of the cutting units in the direction of motion of the machine such that, irrespective of the speed of travel of the machine, the forward and rearward cutting units start cutting operations at substantially the same point on the ground and stop cutting operations at substantially the same point on the ground.

2. A grass machine according to claim 1, wherein there are further provided speed threshold means adapted to supply the common control means with a speed signal indicative of whether the ground speed of the machine is above or below a pre-set threshold; the common control means being switched between a service mode corresponding to zero or very low ground speeds and a cutting mode corresponding to significant ground speeds in dependence on said speed signal and adapted in said service mode, to actuate said unit control means simultaneously in response to a common cutting start signal or a common cutting stop signal and, in said cutting mode, to space actuation of the respective unit control means by said time interval.

3. A grass cutting machine having at least one cutting reel unit; ground speed sensor means for providing an electrical signal indicative of the ground speed of the machine; reel speed sensor means for providing an electrical signal indicative of the driven reel speed of the cutting unit; processor means for computing from said signals a value for the quality of the cut; and display means for displaying said quality of cut value.

* * * * *